US011851160B2

(12) United States Patent
Ye et al.

(10) Patent No.: US 11,851,160 B2
(45) Date of Patent: Dec. 26, 2023

(54) ACTUATION APPARATUS FOR CONTROL OF THIN WING AIRCRAFT SURFACES

(71) Applicant: The Boeing Company, Chicago, IL (US)

(72) Inventors: Michael Yan Ye, New Orleans, LA (US); Bret A. Bowers, Everett, WA (US)

(73) Assignee: The Boeing Company, Chicago, IL (US)

( * ) Notice: Subject to any disclaimer, the term of this patent is extended or adjusted under 35 U.S.C. 154(b) by 73 days.

(21) Appl. No.: 17/554,607

(22) Filed: Dec. 17, 2021

(65) Prior Publication Data
US 2022/0281586 A1 Sep. 8, 2022

Related U.S. Application Data

(60) Provisional application No. 63/155,427, filed on Mar. 2, 2021.

(51) Int. Cl.
B64C 13/30 (2006.01)
B64C 3/10 (2006.01)
B64C 30/00 (2006.01)
B64C 9/00 (2006.01)

(52) U.S. Cl.
CPC ............... B64C 13/30 (2013.01); B64C 3/10 (2013.01); B64C 9/00 (2013.01); B64C 30/00 (2013.01)

(58) Field of Classification Search
CPC .. B64C 13/30; B64C 3/10; B64C 9/00; B64C 30/00; B64C 13/32; B64C 9/04
See application file for complete search history.

(56) References Cited

U.S. PATENT DOCUMENTS

| 11,192,636 | B2* | 12/2021 | Bowers | B64C 13/341 |
|---|---|---|---|---|
| 2002/0047068 | A1* | 4/2002 | Uchida | B64C 13/30 |
| | | | | 244/99.3 |
| 2006/0108479 | A1* | 5/2006 | Rutan | B64C 9/00 |
| | | | | 244/159.1 |
| 2016/0176508 | A1* | 6/2016 | Fevergeon | B64C 9/16 |
| | | | | 244/99.3 |
| 2018/0290726 | A1* | 10/2018 | Sun | B64C 9/22 |
| 2019/0210724 | A1* | 7/2019 | Bublitsky | B64U 10/25 |
| 2019/0322349 | A1* | 10/2019 | Tsai | B64C 3/50 |

* cited by examiner

Primary Examiner — Rodney A Bonnette
(74) Attorney, Agent, or Firm — Quinn IP Law

(57) ABSTRACT

An actuation apparatus for a control surface rotatably coupled to a swept-wing includes a pivot arm coupled to the control surface and proximate the hinged end of the control surface, a drive rod oriented normal to the trailing edge of the swept-wing, the drive rod having an aft end coupled to the pivot arm, a pivot fitting pivotally coupled to a lower surface of the swept-wing by a pivot pin, the pivot fitting having an aft portion coupled to a forward end of the drive rod, and an actuator disposed on the lower surface of the swept-wing. The actuator is coupled to the pivot fitting such that an applied force by the actuator in the streamwise direction rotates the pivot fitting such that the applied force is translated to the drive rod to rotate the control surface.

20 Claims, 7 Drawing Sheets

ACTUATION APPARATUS FOR CONTROL OF THIN WING AIRCRAFT SURFACES

CROSS-REFERENCE TO RELATED APPLICATIONS

This application claims priority to, and the benefit of, U.S. Provisional Patent Application No. 63/155,427 filed Mar. 2, 2021, which is hereby incorporated by reference in its entirety.

INTRODUCTION

The present disclosure relates to the field of aircraft wing systems and actuation mechanisms and apparatus for controlling a control surface of a thin wing aircraft.

High speed aircraft, such as transonic or hypersonic aircraft, often have thin wings to reduce drag and improve aircraft range and performance. Additional drag benefits can be obtained from sweeping the trailing edge of the wing such that the trailing edge is not normal to the airstream over the wing. These features, while reducing aerodynamic drag, increase the difficulty of actuating a moveable surface coupled to the trailing edge of the wing. Actuators that control a control surface or other moveable surface coupled to the trailing edge of the wing are not aligned with the airstream and are packaged within large fairings that are not aligned with the airstream, thus reducing much of the drag benefit of the thin swept-wing design.

SUMMARY

Embodiments according to the present disclosure provide a number of advantages. For example, embodiments according to the present disclosure include an actuation apparatus that includes one or more actuators aligned with the flow of air over the wing. A pivot fitting, such as a bell crank, translates the actuator force to a drive rod rotatably coupled with a hinge on the moveable surface to rotate the moveable surface relative to the wing. In various embodiments, the actuation apparatus has a space-efficient design that is enclosed within a fairing positioned close to the actuator(s) of the actuation apparatus to reduce overall drag.

In one aspect of the present disclosure, an actuation apparatus for a vehicle having a swept-wing includes a control surface having a hinged end pivotally coupled to a trailing edge of the swept-wing. The control surface is oriented non-normal to a streamwise direction of airflow over the swept-wing. The actuation apparatus also includes a pivot arm coupled to the control surface and proximate the hinged end of the control surface, a drive rod oriented normal to the trailing edge of the swept-wing, the drive rod having an aft end coupled to the pivot arm, a pivot fitting pivotally coupled to a lower surface of the swept-wing by a pivot pin, the pivot fitting having an aft portion coupled to a forward end of the drive rod, and an actuator disposed on the lower surface of the swept-wing. The actuator is coupled to the pivot fitting such that an applied force by the actuator in the streamwise direction rotates the pivot fitting such that the applied force is translated to the drive rod to rotate the control surface.

In some aspects, the actuator is disposed on the lower surface of the swept-wing in a streamwise orientation.

In some aspects, the actuation apparatus further includes a fairing coupled to the lower surface of the swept-wing and enclosing the actuator, the pivot arm, the drive rod, and the pivot fitting, wherein the fairing is oriented in the streamwise direction.

In some aspects, the pivot fitting includes a first attachment point, a second attachment point, and a pivot point. The actuator is coupled to the pivot fitting at the first attachment point, the drive rod is coupled to the pivot fitting at the second attachment point, and the pivot fitting is configured to rotate about the pivot point upon application of the applied force by the actuator.

In some aspects, a first distance is defined between the first attachment point and the pivot point, a second distance is defined between the second attachment point and the pivot point, and the first and second distances are adjustable based on a desired actuator load.

In some aspects, a first distance is defined between the first attachment point and the pivot point, a second distance is defined between the second attachment point, and the pivot point and the first distance is equal to or greater than the second distance.

In some aspects, the drive rod includes a first drive rod and a second drive rod, the pivot fitting includes a first pivot fitting and a second pivot fitting, the pivot pin includes a first pivot pin and a second pivot pin, and the actuator includes a first actuator and a second actuator.

In some aspects, each of the first and second drive rods is oriented normal to the trailing edge of the swept-wing and each of the first and second drive rods has an aft end coupled to the pivot arm on the control surface.

In some aspects, the pivot arm includes a first pivot arm and a second pivot arm. Each of the first and second drive rods is oriented normal to the trailing edge of the swept-wing. The first drive rod is coupled to the first pivot arm at a first aft end and to the first pivot fitting at a first forward end and the second drive rod is coupled to the second pivot arm at a second aft end and to the second pivot fitting at a second forward end.

In some aspects, the first actuator is coupled to the first pivot fitting, the second actuator is coupled to the second pivot fitting, and the first and second actuators are oriented parallel to each other and in the streamwise direction.

In some aspects, the first actuator applies a first force to the first pivot fitting such that the first pivot fitting rotates about the first pivot pin and translates the first force to the first drive rod and the second actuator applies a second force to the second pivot fitting such that the second pivot fitting rotates about the second pivot pin and translates the second force to the second drive rod to rotate the control surface.

In some aspects, the first drive rod, the first pivot fitting, and the first actuator are enclosed by a first fairing and the second drive rod, the second pivot fitting, and the second actuator are enclosed by a second fairing. The first and second fairings are coupled to the lower surface of the swept-wing in the streamwise direction and separated by a spacing distance.

In some aspects, the drive rod includes a first drive rod and a second drive rod, the pivot fitting includes a first pivot fitting and a second pivot fitting connected by a connecting rod, and the pivot pin includes a first pivot pin and a second pivot pin. The actuator is coupled to the first pivot fitting such that the applied force by the actuator in the streamwise direction rotates the first pivot fitting about the first pivot pin and, via the connecting rod, the second pivot fitting about the second pivot pin such that the applied force is translated to the first and second drive rods to rotate the control surface.

In some aspects, the actuation apparatus further includes a hinge fitting coupled to the control surface and the aft end of the drive rod is coupled to the pivot arm via the hinge fitting such that the applied force is translated to the drive rod to rotate the hinge fitting about the pivot arm to rotate the control surface.

In another aspect of the present disclosure, a hypersonic or transonic vehicle has a swept-wing having a lower surface and a trailing edge and a control surface having a hinged end pivotally coupled to the trailing edge of the swept-wing. The control surface is oriented non-normal to a streamwise direction of airflow over the swept-wing. At least one pivot arm is coupled to the control surface and proximate the hinged end of the control surface. At least one drive rod is oriented normal to the trailing edge of the swept-wing and the at least one drive rod has an aft end coupled to the at least one pivot arm. At least one pivot fitting is rotatably coupled to a lower surface of the swept-wing and the at least one pivot fitting includes a first attachment point, a second attachment point, and a pivot point. At least one actuator is disposed on the lower surface of the swept-wing and the at least one actuator is coupled to the at least one pivot fitting at the first attachment point. The drive rod is coupled to the pivot fitting at the second attachment point and the pivot fitting is configured to rotate about the pivot point upon application of an applied force by the at least one actuator in the streamwise direction to rotate the control surface.

In some aspects, a first distance is defined between the first attachment point and the pivot point, a second distance is defined between the second attachment point and the pivot point, and the first distance is equal to or greater than the second distance.

In some aspects, the at least one drive rod includes a first drive rod and a second drive rod and the at least one pivot fitting includes a first pivot fitting and a second pivot fitting connected by a connecting rod. The actuator is coupled to the first pivot fitting such that the applied force by the actuator in the streamwise direction rotates the first pivot fitting and, via the connecting rod, the second pivot fitting such that the applied force is translated to the first and second drive rods to rotate the control surface.

In some aspects, the vehicle further includes a fairing coupled to the lower surface of the swept-wing and enclosing the actuator, the pivot arm, the drive rod, and the pivot fitting. The fairing is oriented in the streamwise direction.

In some aspects, the drive rod includes a first drive rod and a second drive rod, the pivot fitting includes a first pivot fitting and a second pivot fitting, the pivot pin includes a first pivot pin and a second pivot pin, and the actuator includes a first actuator coupled to the first pivot fitting and a second actuator coupled to the second pivot fitting. The first actuator applies a first force to the first pivot fitting such that the first pivot fitting rotates about the first pivot pin and translates the first force to the first drive rod and the second actuator applies a second force to the second pivot fitting such that the second pivot fitting rotates about the second pivot pin and translates the second force to the second drive rod to rotate the control surface.

In another aspect of the present disclosure, a swept-wing for a vehicle includes an upper wing surface and a lower wing surface joined by a wing structure, a trailing edge, and an actuation apparatus. The actuation apparatus includes a control surface having a hinged end pivotally coupled to the trailing edge. The control surface is oriented non-normal to a streamwise direction of airflow over the swept-wing. The actuation apparatus also includes a pivot arm coupled to the control surface and proximate the hinged end of the control surface, a drive rod oriented normal to the trailing edge, the drive rod having an aft end coupled to the pivot arm, and a pivot fitting pivotally coupled to the lower wing surface by a pivot pin defining a pivot point. The pivot fitting has a first attachment point and a second attachment point. The actuation apparatus also includes an actuator disposed on the lower wing surface and a fairing coupled to the lower wing surface and enclosing the actuator, the pivot arm, the drive rod, and the pivot fitting. The fairing is oriented in the streamwise direction. The actuator is coupled to the pivot fitting at the first attachment point, the drive rod is coupled to the pivot fitting at the second attachment point, and the pivot fitting is configured to rotate about the pivot point such that an applied force by the actuator in the streamwise direction rotates the pivot fitting such that the applied force is translated to the drive rod to rotate the control surface.

In some aspects, the actuator is disposed on the lower wing surface of the swept-wing in a streamwise orientation.

In some aspects, a first distance is defined between the first attachment point and the pivot point, a second distance is defined between the second attachment point and the pivot point, and the first and second distances are adjustable based on a desired actuator load.

In some aspects, a first distance is defined between the first attachment point and the pivot point, a second distance is defined between the second attachment point and the pivot point, and the first distance is equal to or greater than the second distance.

In some aspects, the drive rod includes a first drive rod and a second drive rod, the pivot fitting includes a first pivot fitting and a second pivot fitting connected by a connecting rod, and the pivot pin includes a first pivot pin and a second pivot pin. The actuator is coupled to the first pivot fitting such that the applied force by the actuator in the streamwise direction rotates the first pivot fitting about the first pivot pin and, via the connecting rod, the second pivot fitting about the second pivot pin such that the applied force is translated to the first and second drive rods to rotate the control surface.

In another aspect of the present disclosure, a method for actuation of a surface coupled to a trailing edge of a swept-wing of a vehicle includes providing an actuation apparatus. The actuation apparatus includes a pivot arm coupled to the surface and proximate the hinged end of the surface and a drive rod oriented normal to the trailing edge of the swept-wing. The drive rod has an aft end coupled to the pivot arm. The actuation apparatus includes a pivot fitting pivotally coupled to a lower surface of the swept-wing by a pivot pin, the pivot fitting having an aft portion coupled to a forward end of the drive rod. The actuation apparatus also includes an actuator disposed on the lower surface of the swept-wing and the actuator is coupled to the pivot fitting. The method includes applying, via the actuator, a force in a streamwise direction to the pivot fitting and inducing rotation of the pivot fitting, via the applied force from the actuator, such that the force is translated to the drive rod to rotate the surface relative to the swept-wing.

In some aspects, the pivot fitting includes a first pivot fitting and a second pivot fitting connected by a connecting rod, the drive rod includes a first drive rod and a second rive rod, and the actuator is coupled to the first pivot fitting. The method further includes inducing rotation of the first pivot fitting and, via the connecting rod, the second pivot fitting, via the applied force from the actuator such that the force is translated to the first and second drive rods to rotate the surface relative to the swept-wing.

In some aspects, the actuator is coupled to the pivot fitting at a first attachment point at a first distance from the pivot pin and the drive rod is coupled to the pivot fitting at a second attachment point at a second distance from the pivot pin. Applying the force via the actuator includes applying the force via the actuator to the pivot fitting at the first distance that is greater than the second distance to yield a mechanical advantage in a force applied via the drive rod to the pivot arm to rotate the control surface.

BRIEF DESCRIPTION OF THE DRAWINGS

The present disclosure will be described in conjunction with the following figures, wherein like numerals denote like elements.

Figure 1:
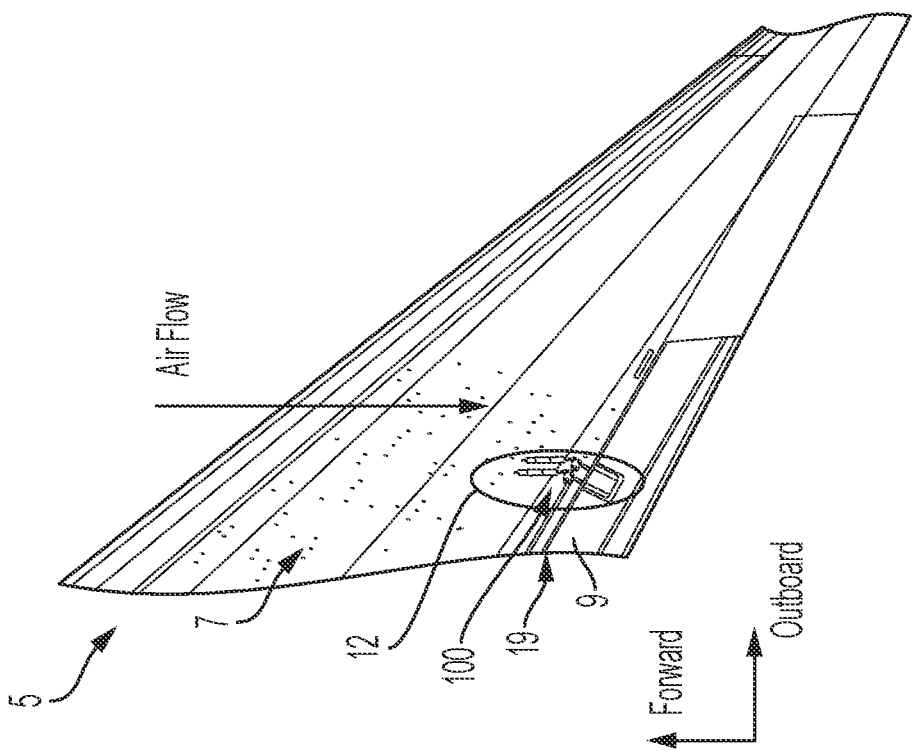
FIG. 1 is a schematic illustration of a wing having an actuation apparatus aligned normal to a moveable surface coupled to the wing.
Figure 2:
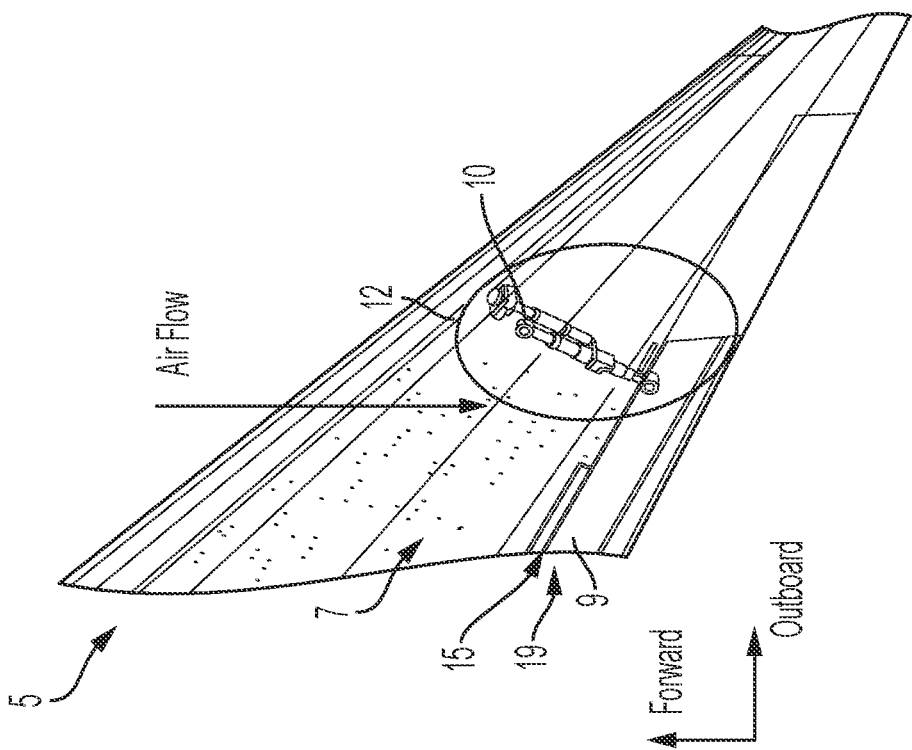
FIG. 2 is a schematic illustration of a wing having an actuation apparatus aligned with an airstream direction over the wing, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "fore," "aft," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

The embodiments discussed herein feature an actuation apparatus configured to rotate a moveable surface coupled to a wing. The actuation apparatus includes one or more actuators aligned with a direction of air flow over the wing to minimize the size and shape of a fairing enclosing the actuation apparatus and reduce the overall drag on the wing. In various embodiments, the wing is a swept-wing and the moveable surface is a control surface rotatably coupled to a trailing edge of the swept-wing.

Referring to the drawings, where like reference numbers refer to like components, an embodiment of an actuation apparatus 10 for an aircraft wing 5 is shown in FIG. 1. In various embodiments, the aircraft wing 5 is a component of a hypersonic or transonic vehicle. A wing structure of the aircraft wing 5 includes an upper wing surface 6 and a lower wing surface 7 joined by at least one spar 8 (see FIGS. 3 and 4). In some embodiments, the wing 5 is a swept-wing having a trailing edge 15. The aircraft wing 5 includes a moveable surface 9 rotatably coupled to the trailing edge 15 of the wing 5. In various embodiments, the moveable surface 9 is a control surface having a hinged end 19 that is pivotally coupled to the trailing edge 15 of the wing 5. The moveable surface 9 is oriented non-normal to a streamwise direction of airflow over the wing 5. In this embodiment, the actuation apparatus 10 is aligned normal to the moveable surface 9 and is enclosed by a fairing 12 coupled to the lower surface 7 of the wing 5. However, to be able to enclose the actuation apparatus 10 and remain in line with the streamwise direction of airflow over the wing, the fairing 12 as illustrated is wide and large, which adds to the overall drag of the wing 5.

Figure 3:
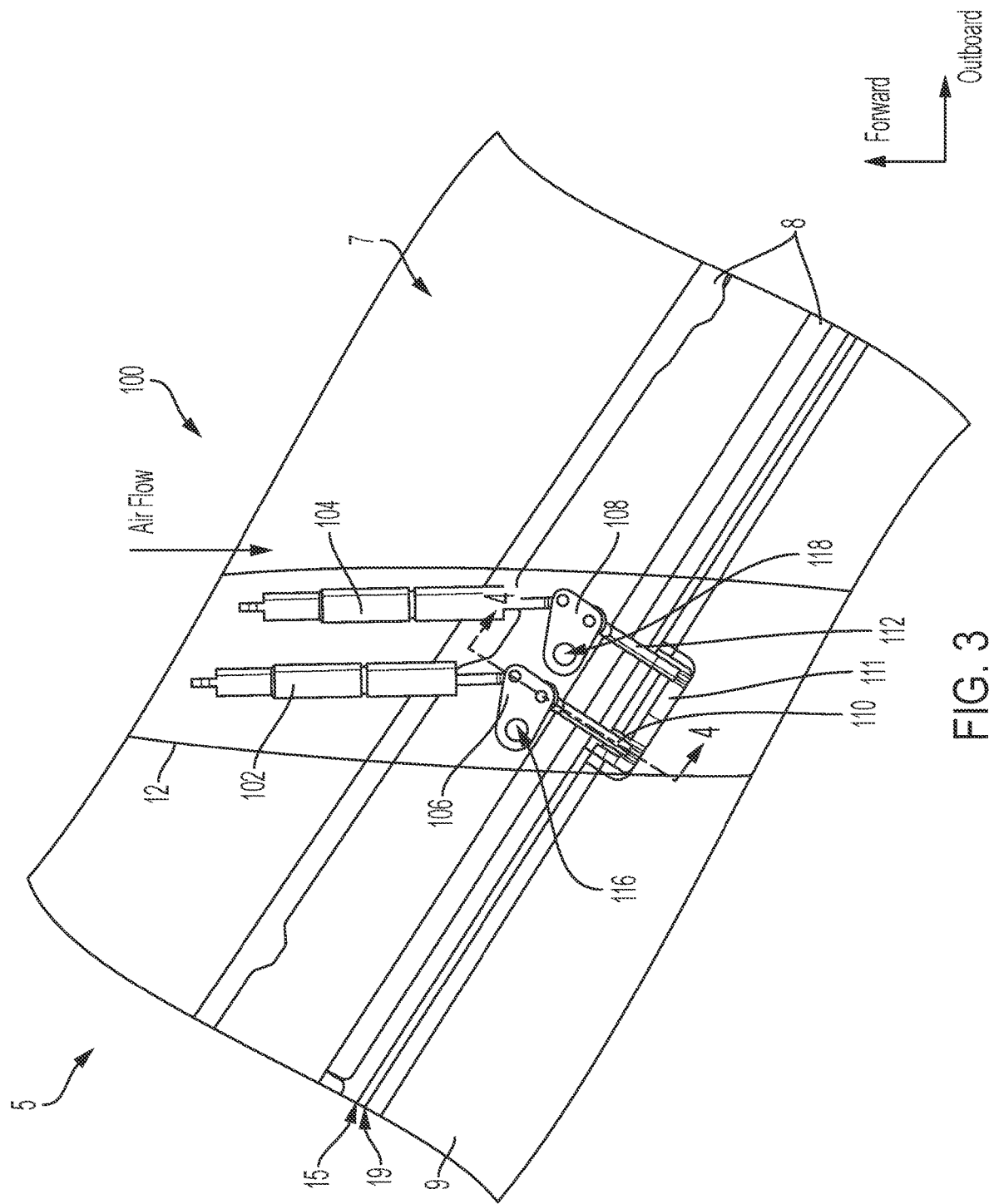
FIG. 3 is a schematic illustration of an actuation apparatus aligned with an airstream direction over the wing, according to an embodiment.

FIGS. 2-5 illustrate an actuation apparatus 100 for the aircraft wing 5 that, due to orientation of the components of the actuation apparatus 100, is enclosed within a smaller fairing than the fairing 12 shown in FIG. 1. With reference to FIG. 3, the actuation apparatus 100 includes a first actuator 102 coupled to the lower surface 7 of the wing 5. The first actuator 102 is oriented in the streamwise direction of airflow over the wing 5 and is coupled to a forward end of a first pivot fitting 106 at a first attachment point. The first pivot fitting 106 is, in some embodiments, a bell crank, and is rotatably coupled to the lower surface 7 of the wing 5 via a first pivot pin 116. The first pivot pin 116 defines a pivot point or point of rotation of the first pivot fitting 106.

The first pivot fitting 106 has an aft end that is coupled to a forward end of a first drive rod 110 at a second attachment point. The first drive rod 110 is oriented normal to the trailing edge 15 of the wing 5 and is coupled at an aft end to a pivot arm 111. The pivot arm 111 is coupled to the moveable surface 9 proximate to the hinged end 19. A first applied force by the first actuator 102 rotates the first pivot fitting 106 about the first pivot pin 116 such that the applied force is translated to the first drive rod 110 to rotate the moveable surface 9 relative to the wing 5.

In various embodiments, the actuation apparatus 100 includes a second actuator 104 coupled to the lower surface 7 of the wing 5. Similar to the first actuator 102, the second actuator 104 is oriented in the streamwise direction of airflow over the wing 5 and is coupled to a forward end of a second pivot fitting 108 at a first attachment point. The second pivot fitting 108 is, in some embodiments, a bell crank, and is rotatably coupled to the lower surface 7 of the wing 5 via a second pivot pin 118. The second pivot pin 118 defines a pivot point or point of rotation of the second pivot fitting 108.

The second pivot fitting 108 has an aft end that is coupled to a forward end of a second drive rod 112 at a second attachment point. The second drive rod 112 is oriented normal to the trailing edge 15 of the wing 5 and is coupled at an aft end to the pivot arm 111. A second applied force by the second actuator 104 rotates the second pivot fitting 108 about the second pivot pin 118 such that the applied force is translated to the second drive rod 112 to rotate the moveable surface 9 relative to the wing 5.

The components of the actuation apparatus 100 are enclosed by the fairing 12. The fairing 12 is coupled to the lower surface 7 of the wing 5 and is oriented in line with the streamwise direction of airflow over the wing 5 to reduce overall drag.

While not shown in FIG. 3, it is understood that each of the first and second actuators 102, 104 may be electronically coupled to a controller. In various embodiments, the controller is an aircraft controller that is configured to coordinate control of each of the actuators 102, 104 to adjust a position of the moveable surface 9. In various embodiments, the first applied force of the first actuator 102 and the second applied force of the second actuator 104 are substantially the same. However, in other embodiments, the controller is configured to adjust the force applied by each of the first and second actuators 102, 104.

Each of the first and second actuators 102, 104 is oriented generally in line with the direction of air flow over the wing 5. As shown in FIG. 3, the first and second actuators 102, 104 are generally parallel to each other and positioned on the lower surface 7 of the wing 5 such that the first and second actuators 102, 104, the first and second pivot fittings 106, 108, the first and second drive rods 110, 112, and the pivot arm 111 are all enclosed within a single fairing 12.

FIG. 3 illustrates a single pivot arm 111 coupled to each of the first and second drive rods 110, 112. However, in other embodiments, each of the first and second drive rods 110, 112 may be coupled to a separate pivot arm 111.

Figure 4:
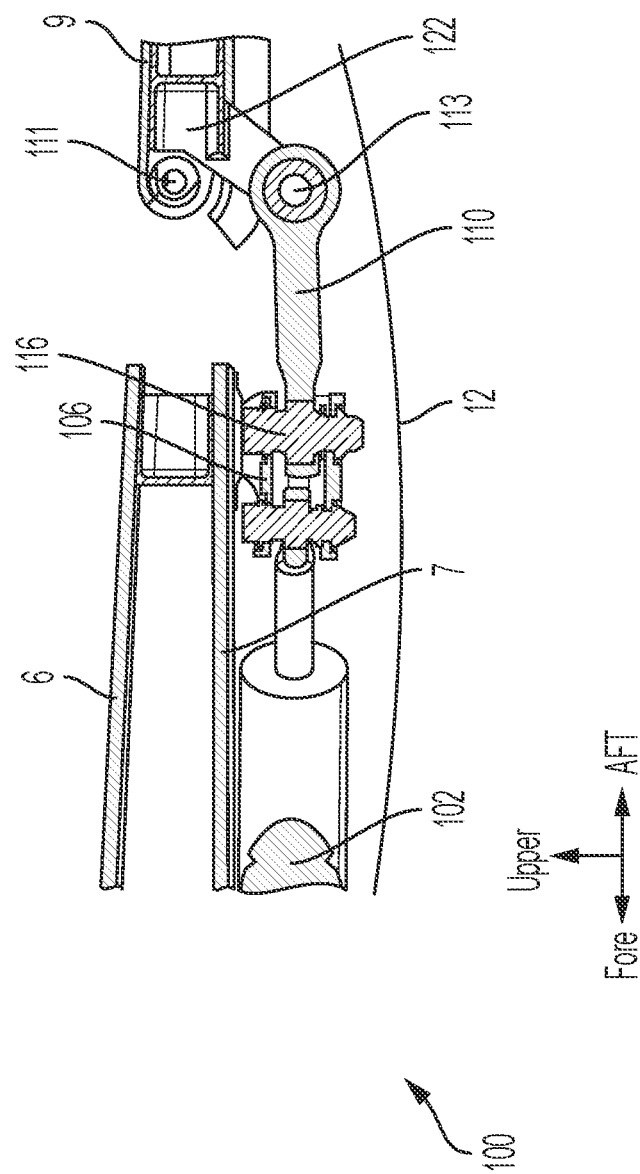
FIG. 4 is a schematic illustration of a sectional view of the wing and actuation apparatus of FIG. 2, according to an embodiment.

With reference to FIG. 4, illustrating a partial sectional view of one actuator, such as the first actuator 102. The first actuator 102 is coupled with a pivot fitting and a drive rod. A hinge fitting 122 is coupled to the moveable surface 9. The hinge fitting 122 includes the pivot arm 111 about which the first and second drive rods 110, 112 rotate. As shown in FIG. 4, the first drive rod 110 is pivotally coupled to the hinge fitting 122 at a connection point 113. The applied force from the first actuator 102 is translated via the first pivot fitting 106 to the first drive rod 110 to rotate the hinge fitting 122 about the pivot arm 111 to rotate the moveable surface 9. While FIG. 4 illustrates a sectional view of the first actuator 102, the first pivot fitting 106, and the first drive rod 110, a similar hinge fitting is used to couple the second drive rod 112 to the pivot arm 111.

Figure 5:
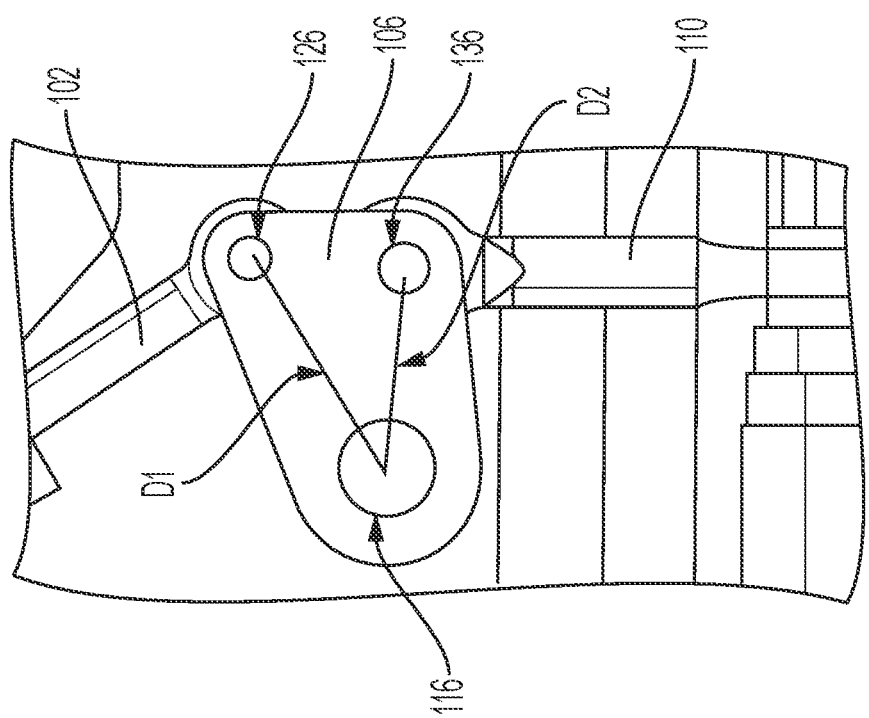
FIG. 5 is a schematic illustration of a pivot fitting of the actuation apparatus of FIG. 2, according to an embodiment.

The geometry of the pivot fitting can be used to affect the actuator load and yield a mechanical advantage in the force applied via the drive rod, such as the first drive rod 110, to the pivot arm 111. FIG. 5 illustrates an enlarged view of the first pivot fitting 106. The first actuator 102 is coupled to the first pivot fitting 106 at a first attachment point 126. The first drive rod 110 is coupled to the first pivot fitting 106 at a second attachment point 136. A first distance D1 is measured between the center of the point of rotation defined by the first pivot pin 116 and the center of the first attachment point 126. A second distance D2 is measured between the center of the point of rotation defined by the first pivot pin 116 and the center of the second attachment point 136. By adjusting the lengths of D1 and D2, the load and stroke of the coupled actuator (in the illustrated embodiment, the first actuator 102) can be tailored to the desired specifications. The actuator load is defined as (D2/D1)*Drive Rod Load. In some embodiments, the first distance D1 is greater than the second distance D2 such that the actuator load is some fraction of the drive rod load. In some embodiments, the first distance D1 is equal to the second distance D2 such that the actuator load is equal to the drive rod load. It is understood that the geometry of the second pivot fitting 108, shown in FIG. 3, for example, may also be tailored to adjust the actuator load and yield a mechanical advantage in the force applied by the second actuator 104 via the second drive rod 112.

Figure 6:
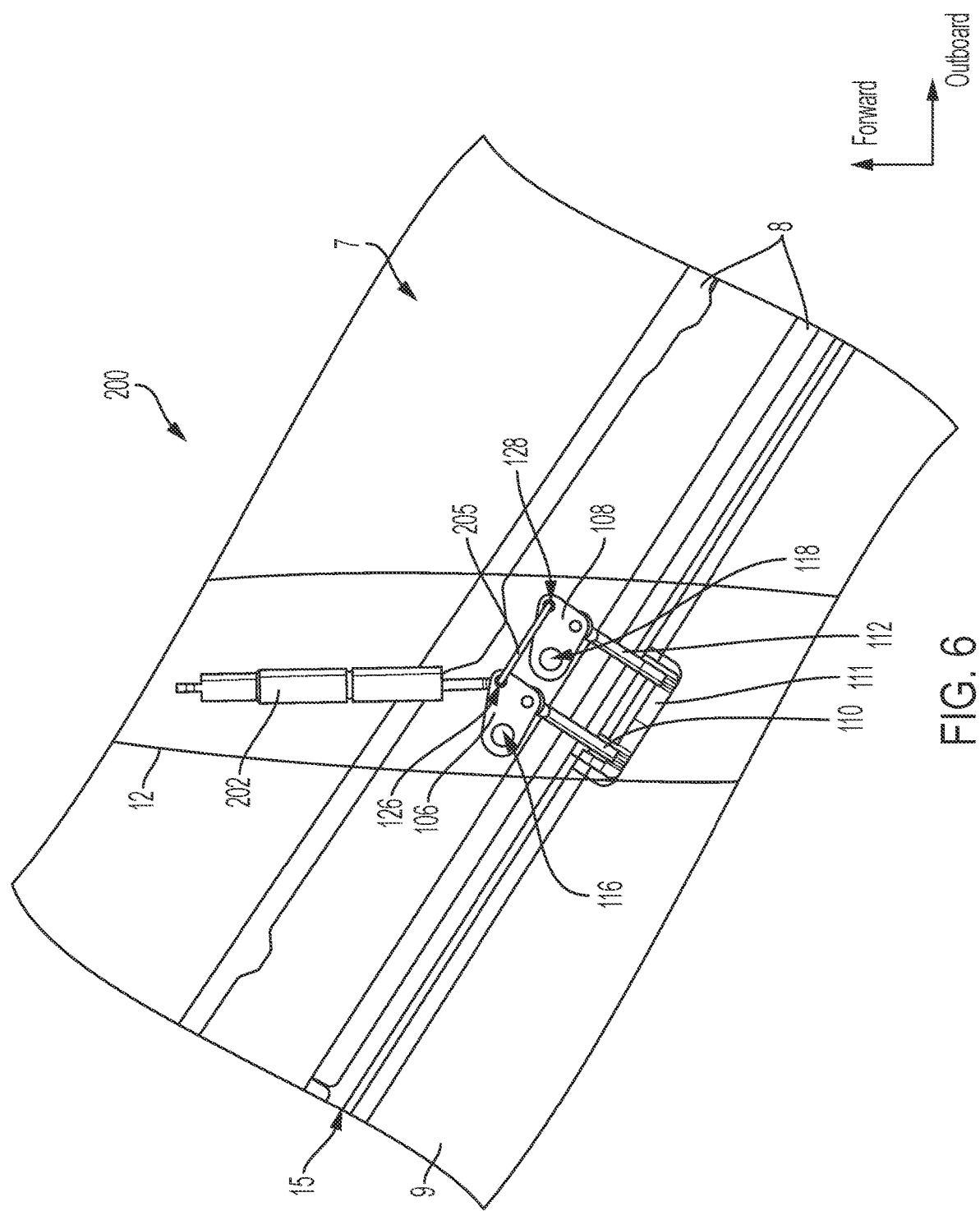
FIG. 6 is a schematic illustration of an actuation apparatus aligned with an airstream direction over the wing, according to another embodiment.

Another embodiment of an actuation apparatus 200 is shown in FIG. 6. In this embodiment, a single actuator 202 is coupled to the first pivot fitting 106. Similar to the actuation apparatus 100, the actuator 202 is aligned with a streamwise direction of airflow over the wing 5 and each of the first and second drive rods 110, 112 is oriented normal to the trailing edge 15 of the wing 5. A connecting rod 205 connects the first pivot fitting 106 and the second pivot fitting 108. As shown, the connecting rod 205 extends between the first attachment point 126 and the second attachment point 128. The applied force from the actuator 202 rotates the first pivot fitting 106 about the first pivot pin 116 and, via the connecting rod 205, rotates the second pivot fitting 108 about the second pivot pin 118. The applied force is thus translated to the first and second drive rods 110, 112 to rotate the moveable surface 9.

Figure 7:
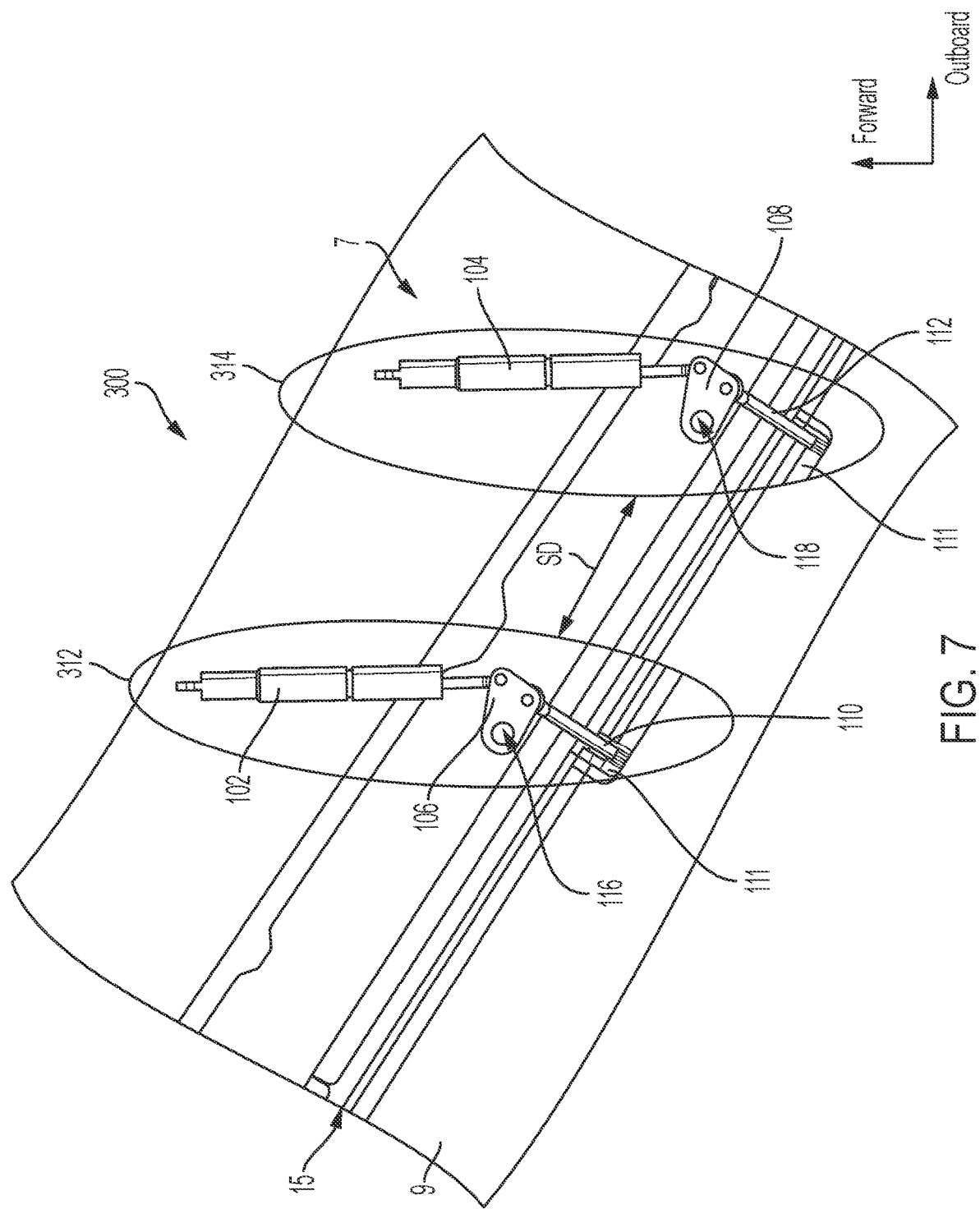
FIG. 7 is a schematic illustration of an actuation apparatus aligned with an airstream direction over the wing, according to another embodiment.

FIG. 7 illustrates another embodiment of an actuation apparatus 300. In the illustrated embodiment, the first actuator 102, coupled with the first pivot fitting 106 and the first drive rod 110, is enclosed within a first fairing 312. The second actuator 104, coupled with the second pivot fitting 108 and the second drive rod 112, is enclosed within a second fairing 314. The first fairing 312 is separated from the second fairing 314 by a spacing distance SD. Similar to the actuation apparatus 100, each of the first and second actuators 102, 104 is aligned with a streamwise direction of airflow over the wing 5 and each of the first and second drive rods 110, 112 is oriented normal to the trailing edge 15 of the wing 5. Additionally, each of the first and second fairings 312, 314 is also aligned with a streamwise direction of airflow over the wing 5. In various embodiments, the first drive rod 110 is coupled to a first pivot arm 111 and the second drive rod 112 is coupled to a second pivot arm 111. In various embodiments, the first and second drive rods 110, 112 are coupled to the same pivot arm 111.

Figure 8:
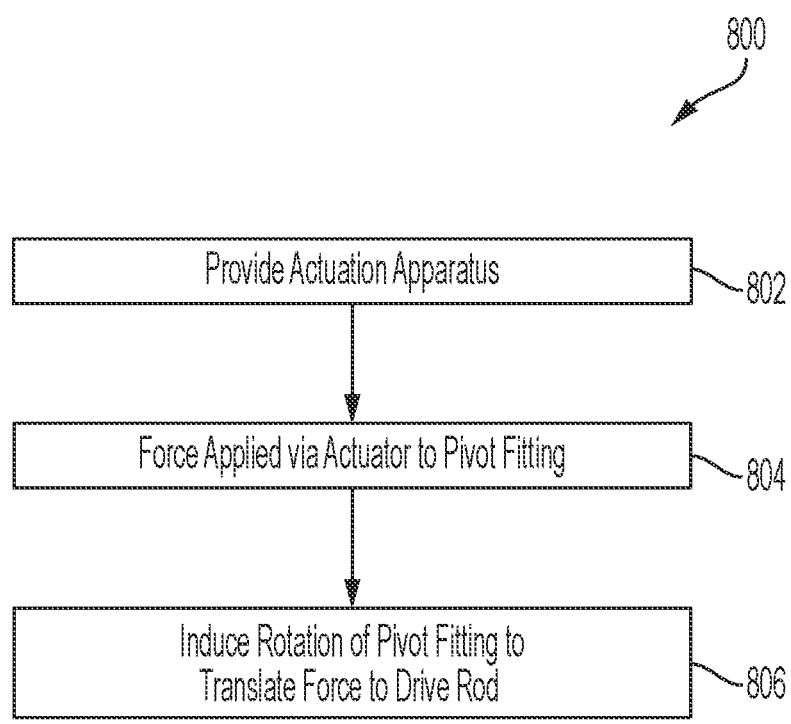
FIG. 8 is a flowchart diagram of a method for actuation of a moveable surface coupled to a trailing edge of a swept-wing of a vehicle, according to an embodiment.

A method 800 for actuation of a moveable surface coupled to a trailing edge of a swept-wing of a vehicle is illustrated in FIG. 8. First, at 802, an actuation apparatus is provided. The actuation apparatus is any of the actuation apparatus discussed herein, including the actuation apparatus 100, 200, or 300. Next, at 804, a force is applied via the actuator to the pivot fitting. As noted herein, the actuator is aligned in a streamwise direction. Finally, at 806, rotation of the pivot fitting is induced from the applied force from the actuator such that that force is translated to the drive rod to rotate the moveable surface relative to the swept-wing.

As discussed herein, the method 800 can be used in conjunction with one or more actuators, one or more pivot fittings, and one or more drive rods, as illustrated by the actuation apparatus 100. Additionally, the method 800 can be used in conjunction with a single actuator coupled to two pivot fittings, as illustrated by the actuation apparatus 200.

In various embodiments, a vehicle, such as a transonic or hypersonic aircraft having a swept-wing, includes a plurality of actuation apparatus, with one or more actuation apparatus coupled to each moveable surface of the swept-wing.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes, and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An actuation apparatus for a vehicle having a swept-wing, comprising:
    a control surface having a hinged end pivotally coupled to a trailing edge of the swept-wing, the control surface being oriented non-normal to a streamwise direction of airflow over the swept-wing;
    a pivot arm coupled to the control surface and proximate the hinged end of the control surface;
    a drive rod oriented normal to the trailing edge of the swept-wing, the drive rod having an aft end coupled to the pivot arm;
    a pivot fitting pivotally coupled to a lower surface of the swept-wing by a pivot pin, the pivot fitting having an aft portion coupled to a forward end of the drive rod; and
    a linear actuator disposed on the lower surface of the swept-wing, the linear actuator coupled to the pivot fitting such that an applied force by the linear actuator in the streamwise direction rotates the pivot fitting such that the applied force is translated to the drive rod to rotate the control surface.

2. The actuation apparatus of claim 1, wherein the linear actuator is disposed on the lower surface of the swept-wing in a streamwise orientation.

3. The actuation apparatus of claim 1 further comprising a fairing coupled to the lower surface of the swept-wing and enclosing the linear actuator, the pivot arm, the drive rod, and the pivot fitting, wherein the fairing is oriented in the streamwise direction.

4. The actuation apparatus of claim 1, wherein the pivot fitting includes a first attachment point, a second attachment point, and a pivot point, and wherein the linear actuator is coupled to the pivot fitting at the first attachment point, the drive rod is coupled to the pivot fitting at the second attachment point, and the pivot fitting is configured to rotate about the pivot point upon application of the applied force by the linear actuator.

5. The actuation apparatus of claim 4, wherein a first distance is defined between the first attachment point and the pivot point, a second distance is defined between the second attachment point and the pivot point, and the first and second distances are adjustable based on a desired actuator load.

6. The actuation apparatus of claim 4, wherein a first distance is defined between the first attachment point and the pivot point, a second distance is defined between the second attachment point and the pivot point, and the first distance is equal to or greater than the second distance.

7. The actuation apparatus of claim 1, wherein the drive rod comprises a first drive rod and a second drive rod, the pivot fitting comprises a first pivot fitting and a second pivot fitting, the pivot pin comprises a first pivot pin and a second pivot pin, and the linear actuator comprises a first actuator and a second actuator.

8. The actuation apparatus of claim 7, wherein each of the first and second drive rods is oriented normal to the trailing edge of the swept-wing and each of the first and second drive rods has an aft end coupled to the pivot arm on the control surface.

9. The actuation apparatus of claim 7, wherein the pivot arm comprises a first pivot arm and a second pivot arm, and wherein each of the first and second drive rods is oriented normal to the trailing edge of the swept-wing, the first drive rod is coupled to the first pivot arm at a first aft end and to the first pivot fitting at a first forward end and the second drive rod is coupled to the second pivot arm at a second aft end and to the second pivot fitting at a second forward end.

10. The actuation apparatus of claim 7, wherein the first actuator is coupled to the first pivot fitting, the second actuator is coupled to the second pivot fitting, and the first and second actuators are oriented parallel to each other and in the streamwise direction.

11. The actuation apparatus of claim 10, wherein the first actuator applies a first force to the first pivot fitting such that the first pivot fitting rotates about the first pivot pin and translates the first force to the first drive rod and the second actuator applies a second force to the second pivot fitting such that the second pivot fitting rotates about the second pivot pin and translates the second force to the second drive rod to rotate the control surface.

12. The actuation apparatus of claim 7, wherein the first drive rod, the first pivot fitting, and the first actuator are enclosed by a first fairing and the second drive rod, the second pivot fitting, and the second actuator are enclosed by a second fairing, and the first and second fairings are coupled to the lower surface of the swept-wing in the streamwise direction and separated by a spacing distance.

13. The actuation apparatus of claim 1, wherein the drive rod comprises a first drive rod and a second drive rod, the pivot fitting comprises a first pivot fitting and a second pivot fitting connected by a connecting rod, the pivot pin comprises a first pivot pin and a second pivot pin, and wherein the linear actuator is coupled to the first pivot fitting such that the applied force by the linear actuator in the streamwise direction rotates the first pivot fitting about the first pivot pin and, via the connecting rod, the second pivot fitting about the second pivot pin such that the applied force is translated to the first and second drive rods to rotate the control surface.

14. The actuation apparatus of claim 1 further comprising a hinge fitting coupled to the control surface and the aft end of the drive rod is coupled to the pivot arm via the hinge fitting such that the applied force is translated to the drive rod to rotate the hinge fitting about the pivot arm to rotate the control surface.

15. A hypersonic or transonic vehicle having a swept-wing, the vehicle comprising:
    a swept-wing having a lower surface and a trailing edge;
    a control surface having a hinged end pivotally coupled to the trailing edge of the swept-wing, the control surface being oriented non-normal to a streamwise direction of airflow over the swept-wing;
    at least one pivot arm coupled to the control surface and proximate the hinged end of the control surface;
    at least one drive rod oriented normal to the trailing edge of the swept-wing, the at least one drive rod having an aft end coupled to the at least one pivot arm;
    at least one pivot fitting rotatably coupled to a lower surface of the swept-wing, the at least one pivot fitting including a first attachment point, a second attachment point, and a pivot point; and
    at least one linear actuator disposed on the lower surface of the swept-wing, the at least one linear actuator coupled to the at least one pivot fitting at the first attachment point;
    wherein the drive rod is coupled to the pivot fitting at the second attachment point and the pivot fitting is configured to rotate about the pivot point upon application of an applied force by the at least one linear actuator in the streamwise direction to rotate the control surface.

16. The vehicle of claim 15, wherein the at least one drive rod comprises a first drive rod and a second drive rod, the at least one pivot fitting comprises a first pivot fitting and a second pivot fitting connected by a connecting rod, and wherein the linear actuator is coupled to the first pivot fitting such that the applied force by the linear actuator in the streamwise direction rotates the first pivot fitting and, via the connecting rod, the second pivot fitting such that the applied force is translated to the first and second drive rods to rotate the control surface.

17. The vehicle of claim 15, wherein the drive rod comprises a first drive rod and a second drive rod, the pivot fitting comprises a first pivot fitting and a second pivot fitting, the pivot pin comprises a first pivot pin and a second pivot pin, and the linear actuator comprises a first actuator coupled to the first pivot fitting and a second actuator coupled to the second pivot fitting, and wherein the first actuator applies a first force to the first pivot fitting such that the first pivot fitting rotates about the first pivot pin and translates the first force to the first drive rod and the second actuator applies a second force to the second pivot fitting such that the second pivot fitting rotates about the second pivot pin and translates the second force to the second drive rod to rotate the control surface.

18. A method for actuation of a surface coupled to a trailing edge of a swept-wing of a vehicle, comprising:
    providing an actuation apparatus comprising a pivot arm coupled to the surface and proximate a hinged end of the surface, a drive rod oriented normal to the trailing edge of the swept-wing, the drive rod having an aft end coupled to the pivot arm, a pivot fitting pivotally coupled to a lower surface of the swept-wing by a pivot pin, the pivot fitting having an aft portion coupled to a forward end of the drive rod, and a linear actuator disposed on the lower surface of the swept-wing, the linear actuator coupled to the pivot fitting;
    applying, via the linear actuator, a force in a streamwise direction to the pivot fitting; and
    inducing rotation of the pivot fitting, via the applied force from the linear actuator, such that the force is translated to the drive rod to rotate the surface relative to the swept-wing.

19. The method of claim 18, wherein the pivot fitting comprises a first pivot fitting and a second pivot fitting connected by a connecting rod, the drive rod comprises a first drive rod and a second rive rod, and the linear actuator is coupled to the first pivot fitting, and the method further comprises inducing rotation of the first pivot fitting and, via the connecting rod, the second pivot fitting, via the applied force from the linear actuator such that the force is translated to the first and second drive rods to rotate the surface relative to the swept-wing.

20. The method of claim 18, wherein the linear actuator is coupled to the pivot fitting at a first attachment point at a first distance from the pivot pin, and the drive rod is coupled to the pivot fitting at a second attachment point at a second distance from the pivot pin, and applying the force via the linear actuator comprises applying the force via the linear actuator to the pivot fitting at the first distance that is greater than the second distance to yield a mechanical advantage in a force applied via the drive rod to the pivot arm to rotate the surface.

\* \* \* \* \*